United States Patent [19]
Choe

[11] Patent Number: 5,713,465
[45] Date of Patent: Feb. 3, 1998

[54] PERSONAL CARRYING CASE AND METHOD FOR PRODUCING SUCH A CASE

[76] Inventor: Sunjeen Choe, 10228 Overhill Dr., Santa Ana, Calif. 92705

[21] Appl. No.: 800,411

[22] Filed: Feb. 14, 1997

[30] Foreign Application Priority Data

Jun. 14, 1996 [KR] Rep. of Korea ............... 21530

[51] Int. Cl.$^6$ ................................................. B65D 81/02
[52] U.S. Cl. ............... 206/314; 206/316.1; 206/523; 206/524.3; 493/89
[58] Field of Search .................... 206/576, 314, 206/14, 316.1, 316.2, 316.3, 320, 523, 524, 591, 592, 593, 594, 524.3; 493/84, 89, 93, 95, 96

[56] References Cited

U.S. PATENT DOCUMENTS

| | | |
|---|---|---|
| 3,326,359 | 6/1967 | Katz . |
| 3,464,541 | 9/1969 | Papendick, et al. . |
| 3,485,347 | 12/1969 | McGill et al. . |
| 4,215,778 | 8/1980 | Kovins . |
| 4,223,785 | 9/1980 | Jacques ............... 206/314 |
| 4,567,069 | 1/1986 | Jabarin ............... 206/524.3 |
| 4,856,655 | 8/1989 | Barsky ............... 206/524 |
| 4,891,081 | 1/1990 | Takahashi et al. ............... 156/78 |
| 5,139,151 | 8/1992 | Chelak ............... 206/523 |
| 5,219,075 | 6/1993 | White ............... 206/314 |
| 5,365,819 | 11/1994 | Maida et al. . |

FOREIGN PATENT DOCUMENTS

| | | |
|---|---|---|
| 653600 | 12/1962 | Canada . |
| 57-203525 | 12/1982 | Japan . |
| 63-280609 | 11/1988 | Japan . |

*Primary Examiner*—Jacob K. Ackun
*Attorney, Agent, or Firm*—Christie, Parker & Hale, LLP

[57] ABSTRACT

A personal carrying case used for keeping, for example, musical instruments, still and movie cameras, notebook computers or important documents is disclosed. The case has a layer bag consisting of inner and outer layers. The above layer bag is formed by precisely cutting a layer material into the inner and outer layers in order to substantially meet objective configuration and size of the case and by joining the inner and outer layers together on their cutting edges. A shock absorbing frame, which has the same configuration and size as those of the case, is cast with the layer bag inside the layer bag as a single structure. The above shock absorbing frame is formed by installing the layer bag in a mold having a cavity of the same configuration and size as those of the case and by injecting a pressurized foam material into the layer bag.

11 Claims, 2 Drawing Sheets

PERSONAL CARRYING CASE AND METHOD FOR PRODUCING SUCH A CASE

BACKGROUND OF THE INVENTION

1. Field of the Invention

The present invention relates, in general, to personal carrying cases used for keeping, for example, musical instruments, still and movie cameras, notebook computers or important documents, and, more particularly, to a structural improvement in such cases in order to produce the cases in a large quantity, standardize the cases and improve the outer appearance of the cases. The invention also relates to a method for producing such cases.

2. Description of the Prior Art

Korean U.M. Publication No. 92-4503 discloses a case used for keeping a musical instrument. In the above Korean musical instrument case, two main panels, which are provided with borders on their outer edges, are assembled with side panels into a case frame. The interior of the above case frame is lined with a soft liner, while the exterior of the case frame is covered with an exterior decoration cover. Each main panel of the above case frame is made of a shock absorbing synthetic resin, which has a density of not lower than $0.03 g/cm^2$ and a bending strength of not lower than $3.5 kg/25 cm^2$. Each of the above borders has a fitting rail on its inner surface, while an associated outer edge of each main panel is provided with a fitting groove. The above borders are put on the outer edges of the main panels by fitting the fitting rails of the borders into the fitting grooves of the main panel's outer edges.

Korean U.M. Publication No. 92-4504 discloses another type of musical instrument case. In this musical instrument case, a plurality of linear and curved side panels are assembled with two main panels into a case frame. The interior of the above case frame is lined with a soft liner, while the exterior of the case frame is covered with an exterior decoration cover. A reinforcing core member is inserted into each curved side panel. In the above musical instrument case, the linear and curved side panels are joined together on their edges thus forming a plurality of junctions.

The above Korean cases use shock absorbing synthetic resin panels in place of typical pulp panels, thus reducing the weight of the cases and improving the shock absorbency of the cases. In this regard, the above Korean cases are well received. However, the above cases have the following problems. That is, the cases must be produced by a labor-intensive process. Another problem of the above Korean cases resides in that it is very difficult to diversify the design of the cases or to precisely meet standard requirements of the cases.

SUMMARY OF THE INVENTION

It is, therefore, an object of the present invention to provide a personal carrying case used for keeping, for example, a musical instrument, a still or movie camera, a notebook computer or important documents in which the above problems can be overcome and which is suitable for mass-production and diversification of design, precisely meets standard requirements, and is provided with a simple and good appearance.

It is another object of the present invention to provide a method for producing the above personal carrying case.

In order to accomplish the above objects, the present invention provides a personal carrying case which includes a layer bag consisting of inner and outer layers. The above layer bag is formed by precisely cutting a layer material into the inner and outer layers in order to substantially meet objective configuration and size of the case and by joining the inner and outer layers together on their cutting edges. A shock absorbing frame, which has the same configuration and size as those of the case, is cast with the layer bag inside the layer bag as a single structure. The shock absorbing frame is formed by installing the layer bag in a mold having a cavity of the same configuration and size as those of the case and by injecting a pressurized foam material into the layer bag.

The present invention also provides a method for producing the above personal carrying case. In the above method, a layer material is precisely cut into the inner and outer layers which are joined together into a layer bag. The layer bag is installed in a cavity of a mold prior to injecting a pressurized foam material into the layer bag. The foam material inside the layer bag is, thereafter, hardened in order to form a shock absorbing frame. The above frame is cast with the inner and outer layers of the layer bag into a case of a single structure.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
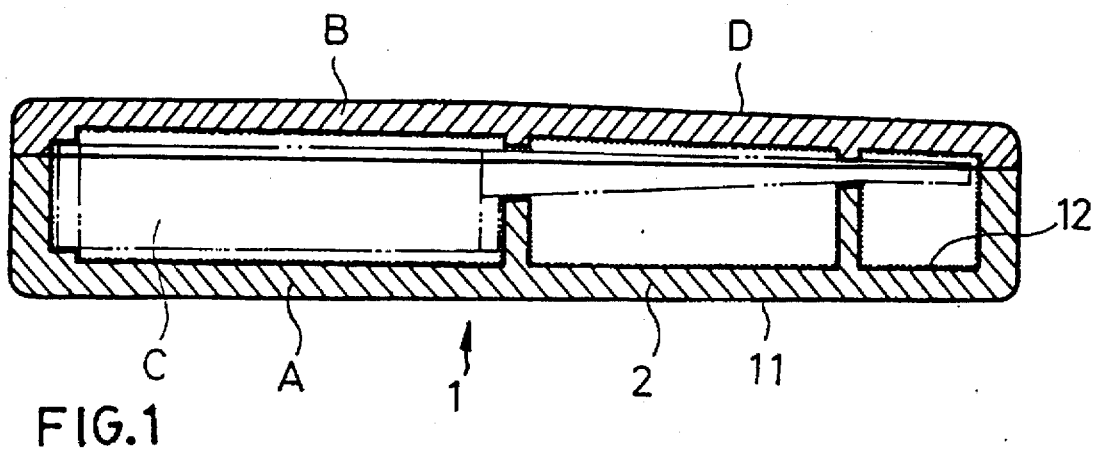
FIG. 1 is a sectional view showing the construction of the personal carrying case in accordance with the present invention.

FIG. 1 is a sectional view of the personal carrying case used for keeping, for example, musical instruments, still and movie cameras, notebook computers or important documents in accordance with the present invention. As shown in FIG. 1, the case of this invention comprises a shock absorbing frame 2, which consists of two parts, that is, a lower part A forming the container frame of the case and an upper part B forming the lid frame of the case. The above upper and lower parts of the shock absorbing frame 2 are separately produced prior to being coupled together into the case. A cavity C, which receives and holds the contents, such as musical instruments, still and movie cameras, notebook computers or important documents, is defined between the upper and lower parts of the case. The outer surface D of the above frame 2 forms the configuration of the case. The interior surface of the above frame 2 is covered with an inner layer 12, while the exterior surface of the frame 2 is covered with an outer layer 11. The inner layer 12 functions as a liner of the case, while the outer layer 11 functions as an exterior decoration cover. The above shock absorbing frame 2 is cast with the inner and outer layers 12 and 11 as a single structure through a method of this invention, which will be described later herein.

Figure 2:
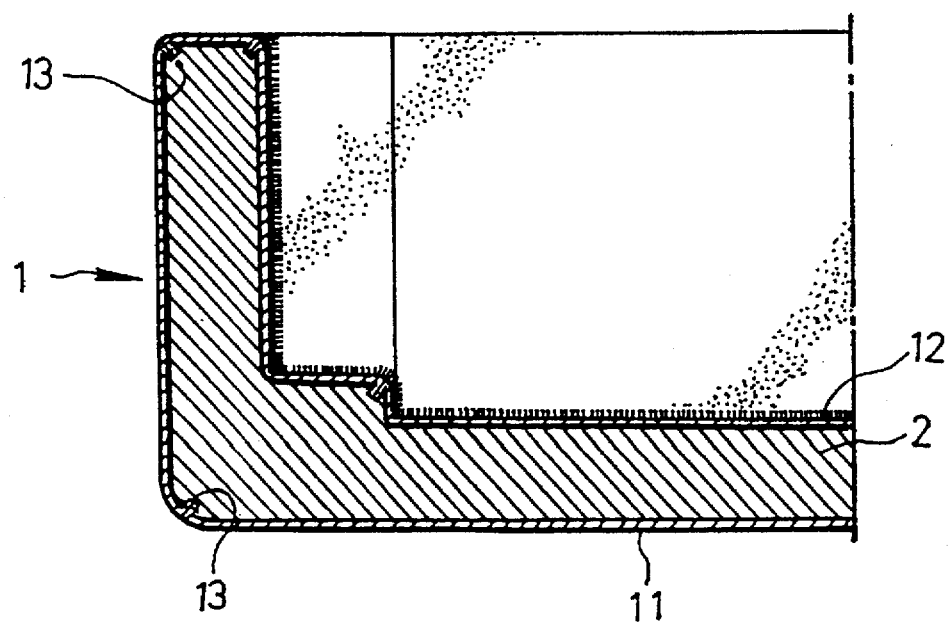
FIG. 2 is a partially enlarged sectional view showing the construction of a corner of the personal carrying case in accordance with the primary embodiment of the present invention.

FIG. 2 is a partially enlarged sectional view showing the construction of a corner of the case produced in accordance with a primary embodiment of this invention. In the embodiment of FIG. 2, a layer material is precisely cut into the inner and outer layers 12 and 11 in order to substantially meet the objective configuration and size of the resulting case. The above inner and outer layers 12 and 11 in turn are joined together into a layer bag 1 having a plurality of junctions 13. The above junctions 13 are formed on the cutting edges of the inner and outer layers 12 and 11, which are joined together. Filled in the above layer bag 1 is a shock absorbing frame 2, which is formed by injecting a foam material into the layer bag 1 prior to hardening the foam material.

The above junctions 13 of the layer bag 1 are formed by sewing, bonding or thermally welding the cutting edges of the inner and outer layers 12 and 11 together into the layer bag 1. The method for joining the cutting edges of the layers and 12 is selected in accordance with the material of the layers 11 and 12. The material of the above inner and outer layers 12 and 11 is selected from the group consisting of woolen fabrics, synthetic resin films, synthetic leathers and natural leathers. The selection of the material for the layers 11 and 12 is influenced by the use and designing conditions of the case.

In order to form the personal carrying case of this invention, a layer material is precisely cut into the layers 11 and 12 in order to substantially meet the objective size and configuration of the case. The above layers 11 and 12 in turn are joined together into the layer bag 1. Thereafter, a foam material is injected into the layer bag 1 installed in a cavity of a mold. The cavity of the mold has the same configuration and size as those of the case. The foam material is, thereafter, hardened in order to form the shock absorbing frame 2 having the same configuration and size as those of the case. The above shock absorbing frame 2 in the above state is cast with the layers 11 and 12 of the layer bag 1 into a single structure, so that the case of this invention is simply produced. In the present invention, the frame 2 inside the layer bag 1 is thick enough to allow the foam material to be smoothly injected into and to smoothly flow in the layer bag 1. In addition, it is preferable to provide a coated layer on the interior surfaces of the layers 11 and 12 in order to not only promote the smooth injection of the foam material into the layer bag 1 but also to improve the sticking force between the layer bag 1 and the shock absorbing frame 2.

Figure 3:
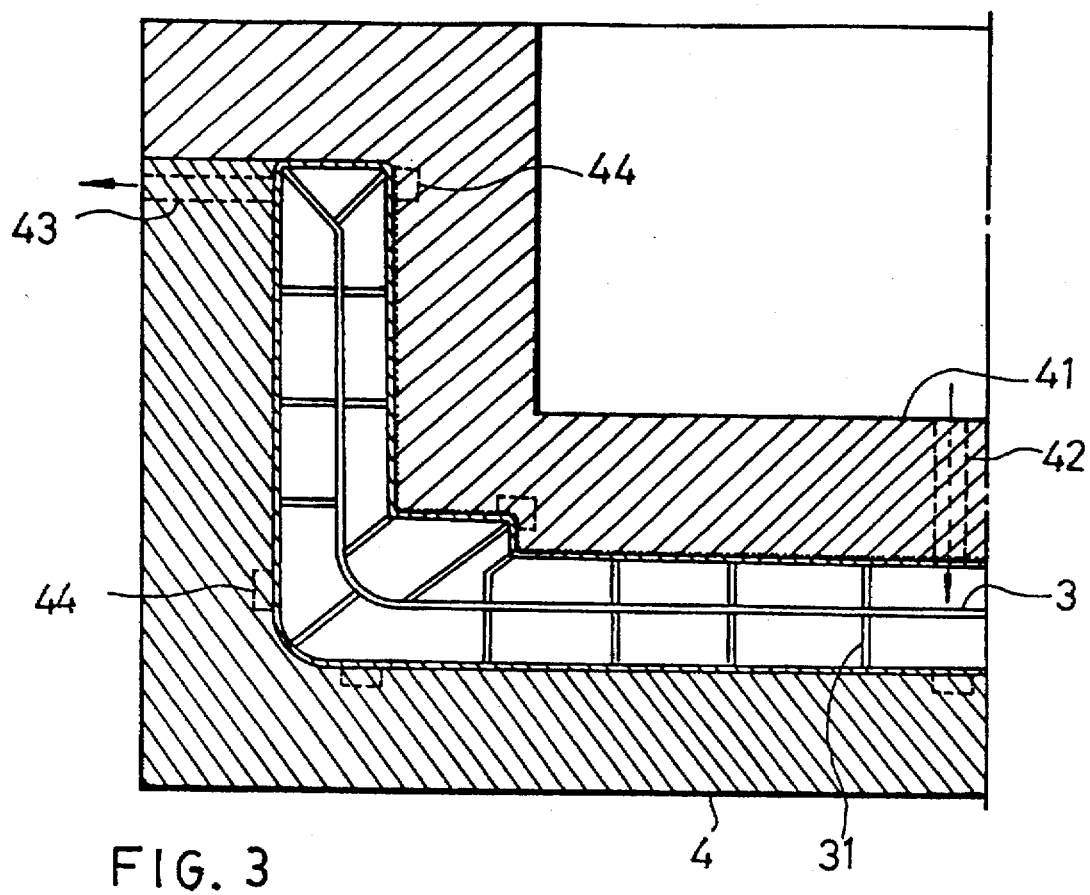
FIG. 3 is a partially enlarged sectional view showing the construction of a corner of the layer bag installed in a mold, the above layer bag being provided with both a reinforcing core member and a holding means in accordance with another embodiment of this invention.

As shown in FIG. 3, the mold 4, which is used for forming the personal carrying case of this invention, includes a core 41 used for forming the cavity C of the case. In order to form the case comprising the container part and the lid part, it is necessary to use two molds, which have the same configurations and sizes as those of the container and lid parts of the case.

While the foam material under pressure is injected into the layer bag 1 installed in the mold 4, it is necessary to prevent the layer bag 1 from being pushed or deformed by the pressurized foam material. In order to achieve the above object, the layer bag 1 must be held on its predetermined position inside the mold 4 while the pressurized foam material is injected into the layer bag 1. In accordance with the present invention, a plurality of pins (not shown) or a plurality of clips 44 may be used as the means for holding the position of the layer bag 1 inside the cavity of the mold 4. The above pins are removed from the case after forming the case, while the clips 44 are provided in the mold 44 as shown in FIG. 3. A pouring gate 42 is formed in the above mold 4, while a foam material inlet hole (not shown) is formed on the layer bag 1 at a position corresponding to the pouring gate 42. The pouring gate 42 of the mold 4 communicates with the interior of the layer bag 1 through the foam material inlet hole when the layer bag 1 is installed inside the mold 4. An air suction port 43 is formed in the mold 4. In the initial stage of the foam material injecting step, the air inside the layer bag 1 is sucked into the atmosphere through the air suction port 43 thus causing the foam material to smoothly and uniformly flow inside the layer bag 1 in order to uniformly reach all corners of the layer bag 1. After the layer bag 1 is installed inside the mold 4, the foam material under constant pressure is injected into the layer bag 1 through the pouring gate 42 of the mold 4. In this case, the air inside the layer bag 1 is forcibly sucked into the atmosphere through the air suction port 43 in the initial stage of the foam material injecting step, thus causing the foam material to smoothly and uniformly reach all corners of the layer bag 1. In the present invention, the viscosity and injection pressure of the foam material are appropriately controlled in order to cause the foam material to uniformly reach all corners of the layer bag 1 while maintaining the uniform density of the foam material inside the layer bag 1. After the foam material is completely injected into the layer bag 1, the foam material is hardened for a predetermined time prior to removing the resulting case from the mold 4. In the above resulting case, the foam material is hardened into the shock absorbing frame 2 which is cast with the layer bag 1 into a single structure.

Figure 4:
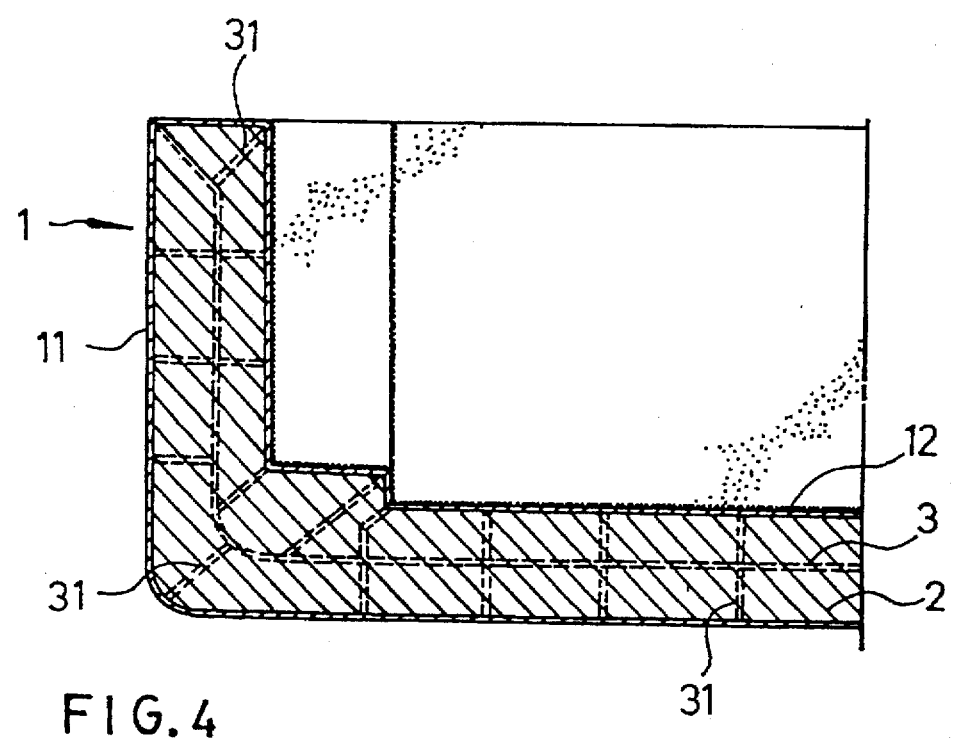
FIG. 4 is a partially enlarged sectional view showing the construction of a corner of the reinforced personal carrying case produced by the layer bag of FIG. 3.

As shown in FIGS. 3 and 4, the layer bag 1 may be provided with a reinforcing core member 3. When the foam material is injected into the above layer bag 1 provided with the reinforcing core member 3, a reinforced case is produced. In the above reinforced case, the reinforcing core member 3 is set in the shock absorbing frame 2 which is integrated with the layer bag 1. The material and configuration of the above reinforcing core member 3 may be freely selected. That is, the reinforcing core member 3 is selected from the group consisting of, for example, perforated panels, wire grilles, synthetic resin plastic reinforcements or metal reinforcements. The above reinforcing core member 3 is arranged between the layers 11 and 12 prior to joining the layers 11 and 12 together into the layer bag 1. The above core member 3 must have a configuration which does not disturb the flowing effect of the pressurized foam material inside the layer bag 1 when the foam material is injected into the layer bag 1. In addition, it is preferred to hold the reinforcing core member 3 at a predetermined position inside the layer bag 1 by a reinforcement holding means 31. The above reinforcement holding means 31 is also preferably used as a means for holding the layer bag 1 inside the mold 4 while the foam material is injected into the layer bag 1.

The following examples are merely intended to illustrate the present invention in further detail and should by no means be considered to limitative of the scope of the invention.

EXAMPLE 1

A flexible synthetic resin was formed into a grille-shaped reinforcing core member 3 in accordance with the objective configuration and size of a resulting case. An outer layer 11 was formed by cutting a synthetic leather in accordance with the configuration and size of the outer surface D of the case, while an inner layer 12 was formed by cutting a woolen fabric in accordance with the configuration and size of the content receiving cavity D of the case. The above inner and outer layers 12 and 11 are joined together on their cutting edges, thus forming a layer bag 1 provided with a plurality of junctions 13. In addition, a mold 4 having a core 41 of the same configuration and size as those of the case was prepared.

Thereafter, the layer bag 1 provided with the reinforcing core member 3 was installed in the core 41 of the mold 4 prior to holding the layer bag 1 on its position inside the cavity 41 by a reinforcement holding means 31. A pressurized foam material was injected into the layer bag 1 through the pouring gate 42 of the mold 4 and was hardened for a predetermined time, thus forming a reinforced shock absorbing frame 2. The shock absorbing frame 2 in the above state was cast with the layer bag 1 into a single structure. That is, the frame 2 was integrated with the layer bag 1 into a reinforced case. After the foam material was completely hardened into the frame 2, the reinforced case was removed from the mold 4.

In the above process, the foam material was a polyurethane foam material produced by adding 17–20 weight parts of isocyanate, 2.5–3.5 weight parts of amine containing catalyst, an appropriate amount of foaming agent and 0.05–1 weight parts of laurel acid stannous stabilizer to 75–85 weight parts of polyol while agitating the polyol.

EXAMPLE 2

Both the layer bag 1 and the mold 4 were produced in the same manner as described for Example 1. Thereafter, the layer bag 1 was installed in the cavity 41 of the mold 4 and was held on its position inside the cavity 41 by a plurality of clips 44. The same foam material as described for the Example 1 was injected into the layer bag 1 and was hardened for a predetermined time, thus forming a shock absorbing frame 2. The shock absorbing frame 2 in the above state was cast with the layer bag 1 into a case. After the foam material was completely hardened into the frame 2, the case was removed from the mold 4.

EXAMPLE 3

The reinforcing core member 3, layer bag 1 and mold 4 were produced in the same manner as described for Example 1. Thereafter, the layer bag 1 provided with the reinforcing core member 3 was installed in the core 41 of the mold 4. A pressurized styrofoam material was injected into the layer bag 1 through the pouring gate 42 of the mold 4 and was hardened for a predetermined time, thus forming a reinforced shock absorbing frame 2. The reinforced shock absorbing frame 2 in the above state was cast with the layer bag 1 into a reinforced case. After the foam material was completely hardened into the frame 2, the reinforced case was removed from the mold 4.

As described above, the present invention provides a structurally-improved personal carrying case which is preferably used for keeping, for example, a musical instrument, a still or movie camera, a notebook computer or important documents. In order to produce the above case, inner and outer layers are formed by precisely cutting a layer material in order to substantially meet the objective configuration and size of a resulting case. The above layers are joined together on their cutting edges into a layer bag. The layer bag is installed in a cavity of a mold. The cavity of the mold has the same configuration and size as those of the case. Thereafter, a pressurized foam material is injected into the layer bag and is hardened for predetermined time, thus forming a shock absorbing frame which is integrated with the layer bag into the case of this invention. The above case is suitable for mass-production and diversification of design, precisely meets standard requirement, and is provided with a simple and good appearance. In addition, because the shock absorbing frame is cast with the layer bag as a single structure, the case of this invention has an enlarged content receiving cavity while not increasing the overall size of the case and thereby achieves the recent trend of compactness and lightness of the cases. Another advantage of the above case resides in that the thick junctions, which are formed on the joined cutting edges of the inner and outer layers of the layer bag, may be positioned inside the layer bag in order to be hidden from view, thus improving the appearance and quality of the case.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A personal carrying case used for keeping the contents such as musical instruments, still and movie cameras, notebook computers or important documents, comprising:

a layer bag consisting of inner and outer layers, said layer bag being formed by precisely cutting a layer material into the inner and outer layers in order to substantially meet objective configuration and size of said case and by joining said inner and outer layers together on their cutting edges; and a shock absorbing frame tightly filled in said layer bag and having the same configuration and size as those of said case and cast with the layer bag as a single structure, said shock absorbing frame being formed by installing said layer bag in a mold having a cavity of the same configuration and size as those of the case and by injecting a pressurized foam material into said layer bag through a pouring gate communicating with the interior of said layer bag.

2. The personal carrying case according to claim 1, wherein said shock absorbing frame is a reinforced frame provided with a reinforcing core member, said reinforcing core member being installed inside said layer bag prior to injecting said foam material into the layer bag installed in the mold thereby being set in the frame.

3. The personal carrying case according to claim 2, wherein said reinforcing core member is made of a synthetic resin and has a grille shape.

4. The personal carrying case according to claim 1 or 2, wherein said foam material is a polyurethane foam material produced by adding 17–20 weight parts of isocyanate, 2.5–3.5 weight parts of amine containing catalyst, an appropriate amount of foaming agent and 0.05–1 weight parts of laurel acid stannous stabilizer to 75–85 weight parts of polyol while agitating said polyol.

5. The personal carrying case according to claim 1 or 2, wherein said foam material is a styrofoam material.

6. The personal carrying case according to claim 1 or 2, wherein said inner and outer layers are made of at least one member selected from the group consisting of woolen fabrics, synthetic resin films, synthetic leathers and natural leathers.

7. The personal carrying case according to claim 2, wherein said reinforcing core member is provided with means for holding the layer bag at a predetermined position inside the cavity of the mold while said foam material is injected into the layer bag installed in the mold.

8. A method for producing a personal carrying case, said case being used for keeping the contents such as musical instruments, still and movie cameras, notebook computers or important documents, comprising the steps of:

precisely cutting a layer material into inner and outer layers in order to substantially meet objective configuration and size of said case and joining the inner and outer layers together into a layer bag;

installing said layer bag in a cavity of a mold, said cavity having the same configuration and size as those of the case;

injecting a pressurized foam material into said layer bag and hardening said foam material in order to form a shock absorbing frame, said frame being cast with said inner and outer layers of the layer bag into a single structure.

9. The method according to claim 8, further comprising a step of installing a reinforcing core member inside said layer bag prior to injecting said foam material into the layer bag installed in the mold, said reinforcing core member being provided with means for holding the layer bag at a predetermined position inside said cavity of the mold while the foam material is injected into the layer bag.

10. The method according to claim 8, wherein said layer bag is precisely held inside said cavity of the mold by a clip provided in said mold.

11. The method according to claim 8, wherein said mold has an air suction port communicating with the interior of said layer bag, so that the air inside the layer bag is sucked into the atmosphere through the air suction port in the initial stage of the foam material injecting step, thus allowing the foam material to more smoothly flow inside the layer bag.

* * * * *